(12) United States Patent
Ceccarelli et al.

(10) Patent No.: US 11,323,365 B2
(45) Date of Patent: May 3, 2022

(54) TEARING DOWN A LABEL SWITCHED PATH THROUGH A COMMUNICATIONS NETWORK

(71) Applicant: Telefonaktiebolaget LM Ericsson (publ), Stockholm (SE)

(72) Inventors: Daniele Ceccarelli, Sollentuna (SE); Paolo Rebella, Genoa (IT); Francesco Fondelli, Genoa (IT)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 17/055,009

(22) PCT Filed: May 17, 2018

(86) PCT No.: PCT/EP2018/063024
§ 371 (c)(1),
(2) Date: Nov. 12, 2020

(87) PCT Pub. No.: WO2019/219203
PCT Pub. Date: Nov. 21, 2019

(65) Prior Publication Data
US 2021/0218668 A1 Jul. 15, 2021

(51) Int. Cl.
*H04L 45/50* (2022.01)
*H04L 41/0604* (2022.01)
(Continued)

(52) U.S. Cl.
CPC .......... *H04L 45/50* (2013.01); *H04L 41/0627* (2013.01); *H04L 45/22* (2013.01); *H04L 45/28* (2013.01)

(58) Field of Classification Search
CPC ..... H04L 45/50; H04L 41/0627; H04L 45/22; H04L 45/28
(Continued)

(56) References Cited

U.S. PATENT DOCUMENTS 7,289,429 B2 * 10/2007 Mo .......................... H04L 45/00
370/217
7,336,648 B1 * 2/2008 Sasagawa ............... H04L 41/08
370/230

(Continued)

FOREIGN PATENT DOCUMENTS

CN     1567844 A     1/2005
CN     1933423 A     3/2007
(Continued)

OTHER PUBLICATIONS

Pan, P et al. "Fast Reroute Extensions to RSVP-TE for LSP Tunnels," RFC 4090, May 2005, pp. 1-38. (Year: 2005).*
(Continued)

*Primary Examiner* — Melvin H Pollack
(74) *Attorney, Agent, or Firm* — Murphy, Bilak & Homiller, PLLC (57) ABSTRACT

In one example aspect, a method is provided for tearing down a label switched path (LSP) through a communications network. The method comprises sending a first message towards an egress node of the LSP informing nodes of the LSP and the egress node of a tear down of the LSP, determining that one of the nodes of the LSP has not forwarded the first message along the LSP, and sending a second message to a controller of the communications network to cause the controller to communicate directly with one of the nodes to inform the one of the nodes of the tear down of the LSP.

26 Claims, 6 Drawing Sheets

(51) Int. Cl.
*H04L 45/00* (2022.01)
*H04L 45/28* (2022.01)

(58) Field of Classification Search
USPC .......................................................... 709/238
See application file for complete search history.

(56) References Cited

U.S. PATENT DOCUMENTS

| | | | | |
|---|---|---|---|---|
| 7,352,758 B2* | 4/2008 | Makam | ............... | H04J 14/0227 370/405 |
| 7,359,377 B1* | 4/2008 | Kompella | ............... | H04L 45/50 370/254 |
| 7,433,315 B2* | 10/2008 | Bhatia | ................. | H04L 1/0001 370/237 |
| 7,451,340 B2* | 11/2008 | Doshi | ................. | H04L 41/0663 370/227 |
| 7,525,907 B2* | 4/2009 | Skalecki | ................... | H04J 3/14 370/228 |
| 7,545,736 B2* | 6/2009 | Dziong | ............... | H04L 41/0668 370/217 |
| 7,564,803 B1* | 7/2009 | Minei | ..................... | H04L 45/00 370/254 |
| 7,881,183 B2* | 2/2011 | Wu | ........................ | H04L 45/507 370/216 |
| 8,335,154 B2* | 12/2012 | So | .......................... | H04L 45/50 370/225 |
| 8,953,500 B1* | 2/2015 | Shen | ...................... | H04L 45/16 370/256 |
| 9,258,221 B2* | 2/2016 | Jain | ......................... | H04L 45/22 |
| 9,344,359 B1* | 5/2016 | Tiruveedhula | .......... | H04L 45/28 |
| 9,407,359 B2* | 8/2016 | Swinkels | ................. | H04L 45/00 |
| 9,473,392 B2* | 10/2016 | Del Regno | .............. | H04L 45/28 |
| 9,479,341 B2* | 10/2016 | Bugenhagen | ........... | H04L 45/28 |
| 9,491,095 B2* | 11/2016 | Ye | .......................... | H04L 45/22 |
| 9,565,128 B2* | 2/2017 | Bryskin | ................. | H04L 47/724 |
| 9,590,895 B2* | 3/2017 | Ramachandran | ..... | H04L 47/728 |
| 9,680,734 B1* | 6/2017 | Tiruveedhula | .......... | H04L 45/16 |
| 9,680,767 B2* | 6/2017 | Karthikeyan | ......... | H04L 47/822 |
| 9,800,325 B1* | 10/2017 | Skalecki | ................. | H04L 45/22 |
| 9,967,183 B2* | 5/2018 | Ashwood-Smith | ..... | H04L 45/34 |
| 9,979,595 B2* | 5/2018 | Choudhury | .......... | H04L 41/0806 |
| 10,044,603 B1* | 8/2018 | Singh | ..................... | H04L 45/42 |
| 10,097,372 B2* | 10/2018 | Bhattacharya | ........ | H04L 45/745 |
| 10,341,228 B1* | 7/2019 | Boyapati | ............... | H04L 47/724 |
| 10,462,039 B2* | 10/2019 | Wood | ...................... | H04L 45/50 |
| 10,476,817 B2* | 11/2019 | Jeganathan | .......... | H04L 12/4641 |
| 10,498,640 B2* | 12/2019 | Chen | ..................... | H04L 45/44 |
| 10,547,543 B2* | 1/2020 | Chen | ..................... | H04L 45/50 |
| 10,659,352 B2* | 5/2020 | Vairavakkalai | ......... | H04L 45/26 |
| 10,715,447 B2* | 7/2020 | Chen | ................... | H04L 41/0896 |
| 10,965,581 B2* | 3/2021 | Jiang | ................... | H04L 43/0852 |
| 2003/0210705 A1* | 11/2003 | Seddigh | ................. | H04L 45/10 370/419 |
| 2004/0081085 A1 | 4/2004 | De et al. | | |
| 2004/0228323 A1* | 11/2004 | Acharya | ................. | H04L 45/00 370/255 |
| 2005/0243833 A1* | 11/2005 | Choudhury | ......... | H04L 47/2441 370/395.1 |
| 2007/0263634 A1* | 11/2007 | Reeves | ................... | H04L 45/00 370/395.5 |
| 2008/0316920 A1* | 12/2008 | Chun | ...................... | H04L 45/28 370/225 |
| 2009/0010154 A1* | 1/2009 | Martinotti | ........... | H04L 12/1877 370/228 |
| 2010/0177631 A1* | 7/2010 | Chen | ...................... | H04L 45/16 370/221 |
| 2013/0155874 A1* | 6/2013 | Sha | ........................ | H04L 12/42 370/242 |
| 2014/0003803 A1* | 1/2014 | Sfeir | ................... | H04J 14/0268 398/7 |
| 2015/0103844 A1* | 4/2015 | Zhao | ..................... | H04L 45/028 370/410 |
| 2015/0195178 A1 | 7/2015 | Bhattacharya et al. | | |
| 2015/0304214 A1* | 10/2015 | Ye | ......................... | H04L 45/507 370/392 |
| 2016/0014029 A1* | 1/2016 | Yuan | ...................... | H04L 47/33 370/236 |
| 2016/0112306 A1* | 4/2016 | Song | .................. | H04Q 11/0066 398/45 |
| 2016/0277282 A1* | 9/2016 | Chen | ..................... | H04L 45/122 |
| 2016/0366051 A1* | 12/2016 | Chen | ..................... | H04L 45/12 |
| 2016/0380889 A1* | 12/2016 | Chen | .................. | H04L 12/4633 370/230 |
| 2017/0012895 A1* | 1/2017 | Zhao | ..................... | H04L 45/507 |
| 2017/0093611 A1* | 3/2017 | Arora | ................. | H04L 12/4625 |
| 2017/0093732 A1* | 3/2017 | Akhavain Mohammadi | ............... | H04L 45/38 |
| 2017/0111282 A1* | 4/2017 | Chen | ..................... | H04L 49/254 |
| 2017/0126587 A1* | 5/2017 | Ranns | ..................... | H04L 45/28 |
| 2017/0134268 A1* | 5/2017 | Easale | ..................... | H04L 45/02 |
| 2017/0195216 A1 | 7/2017 | Ramachandran et al. | | |
| 2018/0019944 A1* | 1/2018 | Peng | ..................... | H04L 45/34 |
| 2018/0026880 A1* | 1/2018 | Nainar | .................... | H04L 45/50 370/389 |
| 2018/0077051 A1* | 3/2018 | Nainar | .................... | H04L 45/28 |
| 2018/0097720 A1* | 4/2018 | Jaffer | ..................... | H04L 67/142 |
| 2018/0123943 A1* | 5/2018 | Lee | ......................... | H04L 45/22 |
| 2018/0167307 A1* | 6/2018 | Barry | ...................... | H04L 45/18 |
| 2018/0205642 A1* | 7/2018 | Li | ............................ | H04L 45/42 |
| 2018/0262440 A1* | 9/2018 | Sitaraman | ............... | H04L 45/28 |
| 2018/0287965 A1* | 10/2018 | Sindhu | ............... | H04L 49/1584 |
| 2018/0367450 A1* | 12/2018 | Sitaraman | ............... | H04L 45/50 |
| 2018/0375764 A1* | 12/2018 | Filsfils | ................ | H04L 61/2007 |
| 2019/0097890 A1* | 3/2019 | Zhang | ..................... | H04L 45/64 |
| 2019/0190746 A1* | 6/2019 | Lee | ........................ | H04L 43/08 |

FOREIGN PATENT DOCUMENTS

| | | | | |
|---|---|---|---|---|
| EP | 2466789 A1 * | 6/2012 | ............ | H04L 45/00 |
| EP | 2466789 A1 | 6/2012 | | |
| WO | 2011119841 A1 | 9/2011 | | |
| WO | 2012079994 A1 | 6/2012 | | |

OTHER PUBLICATIONS

Ayyangar, A. et al. "Label Switched Path Stitching with Generalized Multiprotocol Label Switching Traffic Engineering (GMPLS TE)," RFC 5150, Feb. 2008, pp. 1-19. (Year: 2008).*

K. Shiomoto, E. Oki, W. Imajuku, S. Okamoto and N. Yamanaka, "Distributed virtual network topology control mechanism in GMPLS-based multiregion networks," in IEEE Journal on Selected Areas in Communications, vol. 21, No. 8, pp. 1254-1262, Oct. 2003, doi: 10.1109/JSAC.2003.816620. (Year: 2003).*

P. Ho and H. Mouftah, "Routing and Wavelength Assignment With Multigranularity Traffic in Optical Networks," J. Lightwave Technology, vol. 20, No. 8, 1292-1303 (Aug. 2002). (Year: 2002).*

K. Kar, M. Kodialam and T. V. Lakshman, "Minimum interference routing of bandwidth guaranteed tunnels with MPLS traffic engineering applications," in IEEE Journal on Selected Areas in Communications, vol. 18, No. 12, pp. 2566-2579, Dec. 2000, doi: 10.1109/49.898737. (Year: 2000).*

J. Comellas, R. Martinez, J. Prat, V. Sales and G. Junyent, "Integrated IP/WDM routing in GMPLS-based optical networks," in IEEE Network, vol. 17, No. 2, pp. 22-27, Mar.-Apr. 2003, doi: 10.1109/MNET.2003.1188283. (Year: 2003).*

Lang, J.P. et al. "RSVP-TE Extensions in Support of End-to-End Generalized Multi-Protocol Label Switching (GMPLS) Recovery," RFC 4872, May 2007, pp. 1-47. (Year: 2007).*

D. Griffith and SuKyoung Lee, "A 1+1 protection architecture for optical burst switched networks," in IEEE Journal on Selected Areas in Communications, vol. 21, No. 9, pp. 1384-1398, Nov. 2003, doi: 10.1109/JSAC.2003.818231. (Year: 2003).*

Sripad, A.B., Peijffers, S., Nagarajan, R. and Rodenburg, J.W. (2003), Signaling communications network architectures for Service Intelligent™ optical transport networks. Bell Labs Tech. J., 7: 3-22. (Year: 2003).*

(56) References Cited

OTHER PUBLICATIONS

Awduche, D., et al., "RSVP-TE: Extensions to RSVP for LSP Tunnels", Network Working Group, Request for Comments: 3209, Dec. 2001, 1-61.
Braden, R., et al., "Resource Reservation Protocol (RSVP)", Network Working Group, Request for Comments 2205, Sep. 1997, 1-112.
Gorshe, Steve, "A Tutorial on ITU-T G.709 Optical Transport Networks (OTN)", Issue No. 2, Jun. 2011, 1-110.
Awduche, D., et al., "RSVP-TE: Extensions to RSVP for LSP Tunnels", Network Working Group, Request for Domments: 3209, Dec. 2001, 1-61.
Caviglia, D., et al., "RSVP-TE Signaling Extension for LSP Handover from the Management Plane to the Control Plane in a GMPLS-Enabled Transport Network", Internet Engineering Task Force (IETF), Request for Comments 5852, Apr. 2010, 1-23.
Dhoi, Jin Seek, "Design and Implementation of a Stateful PCE-Based Unified Control and Management Framework tor Carrier-Grade MPLS-TP Networks", Journal of Lightwave Technology, vol. 34, No. 3, Feb. 1, 2016, 1-9.
Drake, J., et al., "Generalized MPLS (GMPLS) RSVP-TE Signalling in support of Automatically Switched Optical Network (ASON)", CCAMP Working Group, Dec. 2003, 1-38.
Kang, Dong, "Research and Implementation of RSVP-TE on Multi-protocol Label Switching", Xi'an University of Electronic Science and Technology, 2012, 1-87.

* cited by examiner

In response to a first message being sent from an ingress node of the LSP towards an egress node of the LSP informing nodes of the LSP and the egress node of a tear down of the LSP, receiving a notification from a first node of the LSP that a second node of the LSP has not forwarded the first message along the LSP — 402

Sending, in response to the notification, a second message directly to one or more nodes in the LSP later than the first node informing the one or more nodes in the LSP later than the first node of the tear down of the LSP — 404

TEARING DOWN A LABEL SWITCHED PATH THROUGH A COMMUNICATIONS NETWORK

TECHNICAL FIELD

Examples of the present disclosure relate to tearing down a label switched path (LSP) through a communications network.

BACKGROUND

Some communication networks, such as for example Optical Transport Networks specified in the ITU-T G.709 recommendation, may have a control plane to control nodes of such networks to reserve (set up) new paths by reserving resources at each node.

The RSVP (Resource reSerVation Protocol) [RFC2205] signaling protocol is a protocol for messages sent between nodes to set up new paths. RSVP-TE (RSVP-Traffic Engineering) [RFC3209] extends RSVP in order to provide a way to establish Label Switched Paths (LSPs) in MPLS (Multi-Protocol Label Switching). To reserve a path, an RSVP-TE (Traffic Engineering) PATH message, in the form of a Generalized Label Request, is sent out from a first node on the path (which acts as an ingress node) via one or more intermediate nodes along the proposed path, to the last node along the path (acting as an egress node). The egress node returns an RSVP-TE RESV message to the ingress node, back along the path via the same nodes, to cause the nodes along the path to confirm the reservation of resources, such as for example bandwidth on switch paths and ports, for the requested path, for traffic of a signal type specified in the message.

In some example communication networks, there may be multiple network domains, and a LSP may traverse multiple domains. In such examples, a node at which a path enters a domain may be referred to as an ingress node for the domain, and a node at which a path leaves a domain may be known as an egress node for the domain.

SUMMARY

One aspect of the present disclosure provides a method for tearing down a label switched path (LSP) through a communications network. The method comprises sending a first message towards an egress node of the LSP informing nodes of the LSP and the egress node of a tear down of the LSP, determining that one of the nodes of the LSP has not forwarded the first message along the LSP, and sending a second message to a controller of the communications network to cause the controller to communicate directly with the one of the nodes to inform the one of the nodes of the tear down of the LSP.

Another aspect of the present disclosure provides a method for tearing down a label switched path (LSP) through a communications network. The method comprises, in response to a first message being sent from an ingress node of the LSP towards an egress node of the LSP informing nodes of the LSP and the egress node of a tear down of the LSP, receiving a notification from a first node of the LSP that a second node of the LSP has not forwarded the first message along the LSP. The method also comprises sending, in response to the notification, a second message directly to one or more nodes in the LSP later than the first node informing the one or more nodes in the LSP later than the first node of the tear down of the LSP.

A further aspect of the present disclosure provides apparatus for tearing down a label switched path (LSP) through a communications network. The apparatus comprises a processor and a memory. The memory contains instructions executable by the processor such that the apparatus is operable to send a first message towards an egress node of the LSP informing nodes of the LSP and the egress node of a tear down of the LSP, determine that one of the nodes of the LSP has not forwarded the first message along the LSP, and send a second message to a controller of the communications network to cause the controller to communicate directly with the one of the nodes to inform the one of the nodes of the tear down of the LSP.

A still further aspect of the present disclosure provides apparatus for tearing down a label switched path (LSP) through a communications network. The apparatus comprises a processor and a memory. The memory contains instructions executable by the processor such that the apparatus is operable to receive, in response to a first message being sent from an ingress node of the LSP towards an egress node of the LSP informing nodes of the LSP and the egress node of a tear down of the LSP, a notification from a first node of the LSP that a second node of the LSP has not forwarded the first message along the LSP, and send, in response to the notification, a second message directly to one or more nodes in the LSP later than the first node informing the one or more nodes in the LSP later than the first node of the tear down of the LSP.

BRIEF DESCRIPTION OF THE DRAWINGS

For a better understanding of examples of the present disclosure, and to show more clearly how the examples may be carried into effect, reference will now be made, by way of example only, to the following drawings in which.

DETAILED DESCRIPTION

The following sets forth specific details, such as particular embodiments or examples for purposes of explanation and not limitation. It will be appreciated by one skilled in the art that other examples may be employed apart from these specific details. In some instances, detailed descriptions of well-known methods, nodes, interfaces, circuits, and devices are omitted so as not obscure the description with unnecessary detail. Those skilled in the art will appreciate that the functions described may be implemented in one or more nodes using hardware circuitry (e.g., analog and/or discrete logic gates interconnected to perform a specialized function, ASICs, PLAs, etc.) and/or using software programs and data in conjunction with one or more digital microprocessors or general purpose computers. Nodes that communicate using the air interface also have suitable radio communications circuitry. Moreover, where appropriate the technology can additionally be considered to be embodied entirely within any form of computer-readable memory, such as solid-state memory, magnetic disk, or optical disk containing an appropriate set of computer instructions that would cause a processor to carry out the techniques described herein.

Hardware implementation may include or encompass, without limitation, digital signal processor (DSP) hardware, a reduced instruction set processor, hardware (e.g., digital or analogue) circuitry including but not limited to application specific integrated circuit(s) (ASIC) and/or field programmable gate array(s) (FPGA(s)), and (where appropriate) state machines capable of performing such functions.

Figure 1:
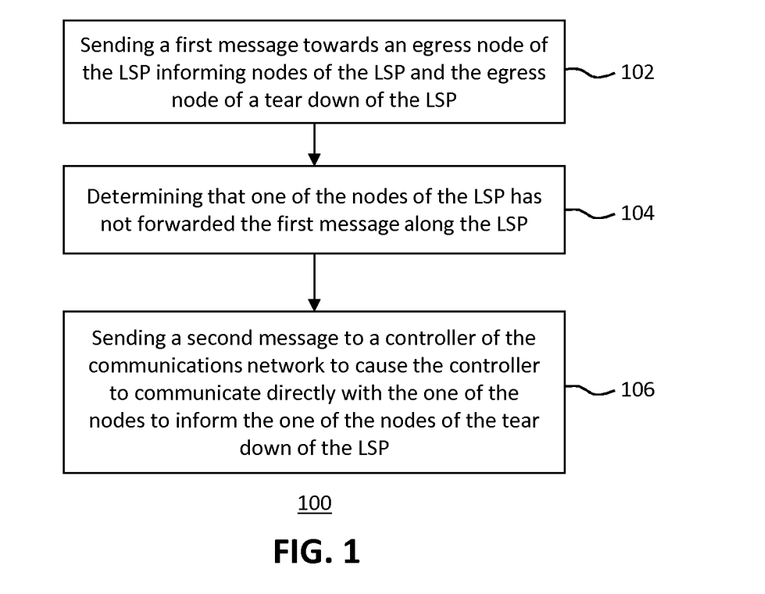
FIG. 1 is a flow chart of an example of a method for tearing down a label switched path (LSP) through a communications network.

FIG. 1 is a flow chart of an example of a method 100 for tearing down a label switched path (LSP) through a communications network. The method may be implemented in some embodiments by, for example, a node in the LSP such as an ingress node, or an ingress node to a domain where the LSP traverses multiple network domains.

The method 100 comprises, in step 102, sending a first message towards an egress node of the LSP informing nodes of the LSP and the egress node of a tear down of the LSP. For example, each intermediate node in the LSP may receive the first message and forward the first message to the next node. In some examples, each node in the LSP receives an acknowledgement when the next node has received the first message. For example, the next node passes the acknowledgement back.

In some examples, the first message causes the nodes that receive the first message to release resources that are reserved for the LSP. In other embodiments, the first message informs the nodes of the LSP that a tear down will occur, and the resources are released later, for example in response to a further message being sent along the LSP.

The method 100 also includes, in step 104, determining that one of the nodes of the LSP has not forwarded the first message along the LSP. For example, the one of the nodes may have a fault, or a communication link between the one of the nodes and a preceding node along the LSP has a fault. In some examples, the preceding node (e.g. the node along the LSP immediately before an unresponsive node) may determine that the one of the nodes has not returned an acknowledgement of the first message, and may therefore send a notification of this to the ingress node along the LSP, and may also identify the one of the nodes that has not returned an acknowledgement. In some examples, determining that the one of the nodes of the LSP has not acknowledged receipt of the first message comprises receiving a notification from another node in the LSP earlier in the LSP than the one of the nodes in the LSP. For example, the ingress node may receive the notification.

The method 100 also includes the step 106 of sending a second message to a controller of the communications network to cause the controller to communicate directly with the one of the nodes to inform the one of the nodes of the tear down of the LSP. Therefore, for example, subsequent communication to inform the one of the nodes of the tear down may be directly between the controller and the one of the nodes. In some examples, where the one of the nodes has developed a fault, the controller of the communications network may see when the one of the nodes becomes operational again, and may then communicate with the one of the nodes. In some examples, direct communication means communication between the controller and the node without using one or more of the nodes of the LSP, and may in some examples be via one or more other network nodes.

In some examples, as the controller communicates directly with the one of the nodes (e.g. when it notices it has come back online and is once again operational), and in some cases also other nodes that may not have received the first message (e.g. nodes later along the LSP than the one of the nodes), there may be no need for another node in the LSP, for example the ingress node, to repeatedly attempt to communicate with the one of the nodes to inform that node of the tear down of the LSP, thus avoiding the associated load on the network. In some examples, the failure of a node (and thus the node becoming unreachable or responsive) may cause the nodes along the LSP and/or other nodes in the network to exchange a large number of messages due to, for example, notifications and/or rerouting of paths within the network. Therefore, some examples avoid nodes of the LSP from adding significantly to the additional traffic (e.g. control plane traffic) by allowing the network controller to contact the failed node directly (and also in some examples other nodes such as nodes later than the failed node along the LSP). For example, the failed node may be contacted directly by the controller when the controller notices the failed node has become operational again.

In some examples, for example in a scenario where the LSP is intended for unidirectional communications, the controller may also communicate directly with one or more further nodes of the LSP later than the one of the nodes of the LSP to inform the one or more further nodes of the LSP nodes of the tear down of the LSP. For example, the one of the nodes that has not forwarded the first message (e.g. due to a fault) results in nodes further along the LSP also not receiving the first message. Therefore, these nodes may receive information of the tear down directly from the controller.

Figure 2:
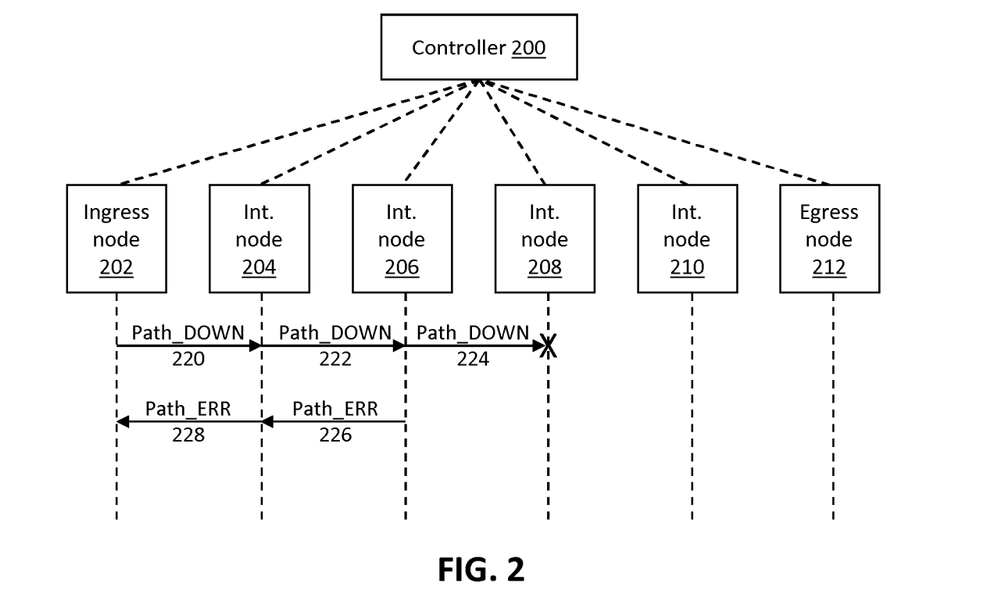
FIG. 2 shows an example of communications within a communications network.

FIG. 2 shows an example of communications within a communications network. The communications network includes a controller 200 and a LSP that comprises an ingress node 202, intermediate nodes 204, 206, 208 and 210 and an egress node 212. In other examples, the LSP may have any number of intermediate nodes. In the example shown, the ingress node 202 sends a first message (e.g. Path_DOWN message 220) towards the egress node 212. This may in some examples be initiated in response to an instruction from the controller 200 to tear down the LSP.

The first message is received at intermediate node 204 and forwarded to intermediate node 206 as for example Path_DOWN message 206. The intermediate node 206 in turn forwards the message to the intermediate node 208, for example as Path_DOWN message 224. However, the intermediate node 208 does not receive or acknowledge this message, for example due to a fault at the intermediate node 208, or due to a fault in a communication link between the intermediate nodes 206 and 208.

The intermediate node may notice that the intermediate node 208 has not received or acknowledged the message 224, for example following a timeout. As a result, it sends a message such as for example Path_ERR message 226 to the intermediate node 204, which forwards this as a message e.g. Path_ERR message 228 to the ingress node 202. Once the ingress node 202 receives the message 228, it informs the controller 200 that the first message may not have propagated along the entire length of the LSP. In some examples the messages 226 and 228 identify the intermediate node 208, and the ingress node 202 informs the controller that the intermediate node 208 is blocking the first message. Therefore, the controller may subsequently communicate directly with the intermediate node 208 to inform the intermediate node 208 of the tear down of the LSP, for example when the intermediate node becomes operational again (in cases where it had developed a fault for example). In some examples, the controller 200 may also communicate directly with the intermediate node 210 and the egress node 212 to inform these nodes of the tear down.

In some examples, the nodes of the LSP may not release resources in response to the first message. Therefore, in some examples, a further message may be sent through the LSP, such as for example a Tear_Down message, and each node may release resources reserved for the LSP upon receipt of this message. In some examples, the one of the nodes (e.g. the node 208 at fault) and any later nodes along the LSP may receive such a message or instruction directly from the controller 200.

Figure 3:
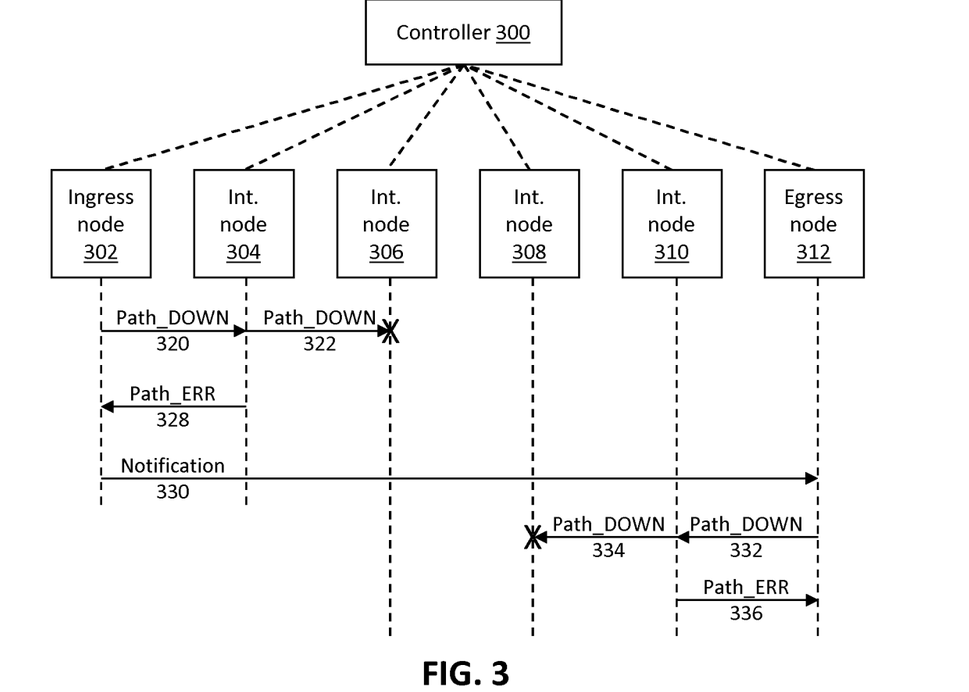
FIG. 3 shows an example of communications within a communications network.

In some examples, the LSP may be bidirectional. That is, for example, the LSP may carry traffic, including control plane traffic and other traffic, in both directions along the LSP. Therefore, in some examples, the method comprises, in response to determining that the one of the nodes of the LSP has not forwarded the first message along the LSP, sending a notification to the egress node along a path other than the LSP that the one of the nodes of the LSP has not forwarded the first message along the LSP. FIG. 3 shows an example of communications within a communications network. The communications network includes a controller 300 and a LSP that comprises an ingress node 302, intermediate nodes 304, 306, 308 and 310 and an egress node 312. In other examples, the LSP may have any number of intermediate nodes. In the example shown, the nodes 302, 304 and 306 exchange or send messages 320, 322 and 328 in a manner similar to the messages 220, 222 and 228 described above with reference to FIG. 2. Therefore, in this example, the intermediate node 306 is not forwarding or acknowledging the first message 322.

As such, in the example shown, a message 328 (e.g. Path_ERR) is sent back to the ingress node 302 along the LSP. As a result, the ingress node 302 may inform the controller that the node 308 is not operational. In addition, a notification 330 is sent by the ingress node 302 to the egress node 312 along a path other than the LSP (e.g. through one or more other nodes in the communications network) that the one of the nodes of the LSP (i.e. the intermediate node 308) has not forwarded the first message along the LSP. In some examples, the notification 330 may identify the intermediate node 308, while in other examples the notification 330 may omit this information.

Upon receipt of the notification 330, the egress node 312 may perform the method 100. In some examples, the egress node may send a third message 332 (e.g. Path_DOWN) to intermediate node 310, which attempts to forward the message (e.g. as Path_DOWN message 334) to the intermediate node 308. In the example shown, the intermediate node 308 is another node that does not forward or acknowledge the message. Therefore, the node 310 returns a message 336 (e.g. Path_ERR) to the egress node 312. The egress node 312 may then inform the network controller 300 that the node 308 did not forward or acknowledge the message.

In some examples, the controller 300 may then communicate directly with the intermediate nodes 306 and 308, and any nodes on the LSP that may be between these nodes, to inform them of the tear down of the LSP. In some examples, as the controller communicates directly with the nodes 306 and 308 (and in some examples any nodes therebetween along the LSP), there may be no need for other nodes in the LSP, for example the ingress node 302 and egress node 312, to repeatedly attempt to communicate with the nodes 306 and 308 respectively to inform those nodes of the tear down of the LSP, thus avoiding the associated load on the network, particularly if for example the failure of a node results in a large number of notifications and/or rerouting of paths through the network.

Thus, in some examples, a node such as the egress node 312 may determine that a further one of the nodes of the LSP (in this example, the node 308) has not forwarded the third message along the LSP, and send a fourth message to the controller 300 of the communications network to cause the controller 300 to communicate directly with the further one of the nodes to inform the further one of the nodes of the tear down of the LSP.

In some examples, the LSP may traverse different network domains. Therefore, an ingress node may receive a notification (e.g. Path_ERR message) that specifies that a node along the LSP in a different domain is unresponsive, e.g. has not forwarded or acknowledged the first message (e.g. Path_DOWN). In such examples, the controller may not be able to communicate directly with the unresponsive node. Therefore, in some examples, sending the second message to the controller of the communications network comprises causing the controller to send a message to an ingress node of a different network domain to the controller to send a message towards an egress node of the LSP in the different network domain to inform nodes of the LSP in the different domain and the egress node of the different domain of the tear down of the LSP. In some examples, the message sent to eh ingress node of the different network domain may be sent via a further controller of the different network domain. The ingress node of the different domain may therefore, in some examples, carry out the method 100.

In some examples, the different network domain is not the domain that includes the unresponsive node. Therefore, the method 100 may be carried out for example by the ingress node of the different network domain with regard to the portion of the LSP in the different network domain (and following network domains, if any). In such examples, the method may also include sending the second message to the controller of the communications network to cause the controller to send a further message to an alternative controller of an alternative network domain (e.g. that contains the unresponsive node), wherein the further message identifies the unresponsive node. The alternative controller of the alternative network domain may then for example communicate directly with the responsive node, and any nodes within the alternative domain that follow the unresponsive node, to inform them of the tear down of the LSP.

In some examples, therefore, nodes of the LSP can be informed of the tear down of the LSP, and the controllers of the various network domains can contact directly those nodes that for example have become unresponsive and become responsive again, without the various domains sharing detailed network topology with each other or even details regarding nodes that are along the LSP. For example, a communication sent back along the LSP to notify of an unresponsive node may identify the unresponsive node in some manner (e.g. that would allow the controller of the domain containing the unresponsive node to know which node is the responsive node) but this may in some examples not pass back detailed network topology information.

Figure 4:
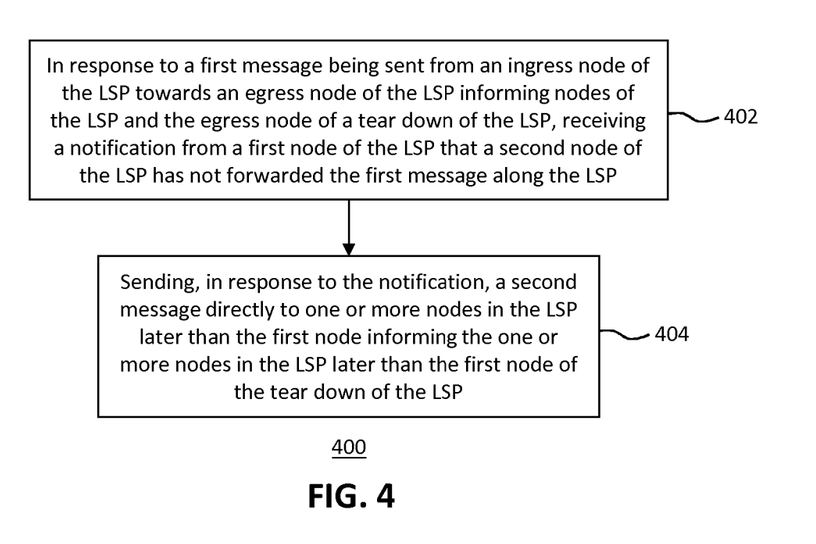
FIG. 4 shows an example of a method for tearing down a LSP through a communications network.

FIG. 4 shows an example of a method 400 for tearing down a label switched path (LSP) through a communications network. The method 400 may be carried out for example by a network controller or a network domain controller. The method 400 comprises, in step 402, in response to a first message (e.g. a Path_DOWN message) being sent from an ingress node of the LSP towards an egress node of the LSP informing nodes of the LSP and the egress node of a tear down of the LSP, receiving a notification from a first node of the LSP that a second node of the LSP has not forwarded the first message along the LSP. The first node may in some examples be a node in the LSP preceding or earlier than the second node. For example, the first node may be the ingress node of the LSP.

The method 400 also includes, in step 404, sending, in response to the notification, a second message directly to one or more nodes in the LSP later than the first node informing the one or more nodes in the LSP later than the first node of the tear down of the LSP. The second message may be sent for example once the network controller determines that the second node is back online and is responsive to control plane messages. In some examples, sending the second message directly to the one or more nodes in the LSP comprises sending a message to each of the one or more nodes in the LSP. Thus, for example, a network controller may communicate directly with each of the one or more nodes (e.g. one or more nodes later than the second node in the LSP, in some examples including the egress node).

In some examples, the LSP may span multiple domains. As such, for example, the one or more nodes in the LSP later than the first node comprise nodes in a first domain, and the LSP includes nodes in a second domain. The method may comprise sending, to a controller of the second domain, a notification that the second node of the LSP has not forwarded the first message along the LSP. The controller of the second domain may then take steps to inform the second node (and in some examples nodes following the second node within the second domain) of the tear down of the LSP. In some examples, where there is a hierarchical arrangement of network controllers, the notification that the second node of the LSP has not forwarded the first message along the LSP may be sent via a further controller of the communications network, e.g. a higher level controller than the controller of the second domain.

In some examples, the method 400 comprises sending a message to the ingress node of the LSP to cause the ingress node to send the first message towards the egress node of the LSP.

Particular example embodiments will now be described below.

Embodiments disclosed herein may relate to the following scenarios:
  Hybrid SDN (Software Defined Networking)/GMPLS (Generalized Multi-Protocol Label Switching): a Safe Deletion procedure leveraging on the direct connectivity between a centralized SDN controller and the nodes in the network.
  Multiple domains: a Safe Deletion procedure not to be just a procedure between nodes (and between a node and a controller) but also a procedure between SDN controllers to make sure that the different segments of end to end LSPs are correctly deleted.

Figure 5:
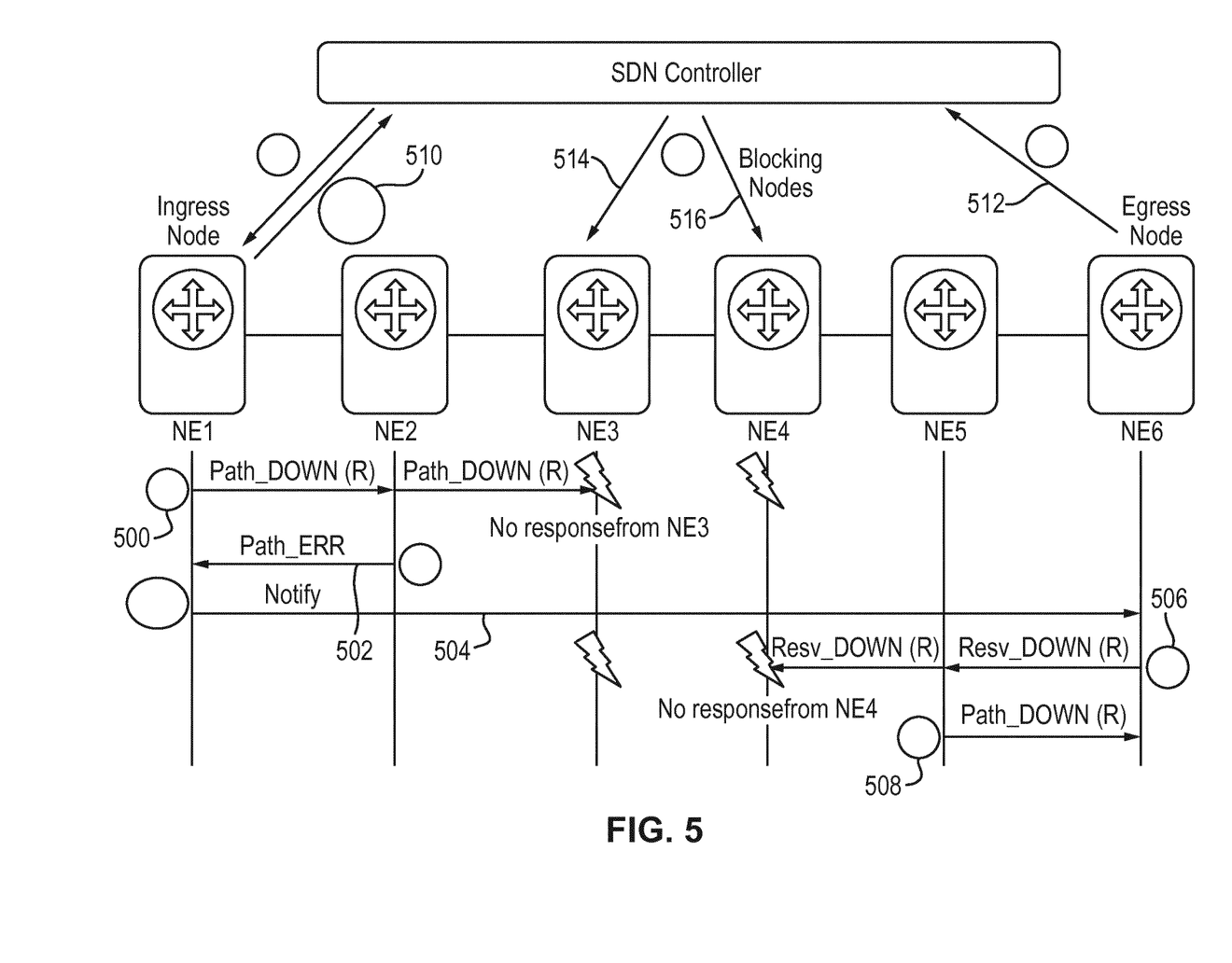
FIG. 5 shows an example of communications in a network during tearing down a LSP.

In a hybrid control plane scenario, e.g. where the LSP traverses a single network domain, there may be advantages in terms of a centralized intelligence (PCE, performance collection, fault management) and/or of distributed protocols (faster reaction, higher scalability etc). FIG. 5 shows an example of communications in a network during tearing down a LSP. The network includes an ingress node (NE1), intermediate nodes (NE2, . . . , NE5) and an ingress node (NE6). In this example Safe Deletion procedure, the ingress node NE1 starts the deletion procedure with message 500, the previous node (node NE2) with respect to the unreachable/unresponsive one (node NE3) notifies the problem to the ingress node NE1 with message 502 and the ingress node asks the other end of the LSP with notification 504 to start the tear down in the opposite direction from the egress node NE6 using message 506. In this example this returns an error message 508 to the ingress node NE6 as node NE4 is unresponsive (blocking).

In the bidirectional LSP scenario shown in FIG. 5, the ingress node NE1 sends a notification 510 of the first unreachable node (NE3) to the SDN controller. The egress node NE6. The egress node then notifies the SDN controller with notification 512 that the first unreachable node from its side is NE4. The SDN controller can correlate the info from the two end nodes and understand that the failure/unreachability situation is impacting nodes NE3 and NE4. The SDN controller can wait for the nodes to become responsive, for example by waiting until the nodes appear in a topological update (meaning they are again reachable). Once they appear again, the SDN controller can directly ask these nodes NE3 and NE4 with respective messages 514 and 516 to release the resources related to the deleted LSP and hence make sure that all the unused resources in the network are released. In some examples, the ingress node NE1, egress node NE6 and/or SDN controller may send a further message (e.g. Path_Tear) to one or more nodes to trigger the actual release of resources, as opposed to messages that inform one or more nodes that the tear down will occur.

Figure 6:
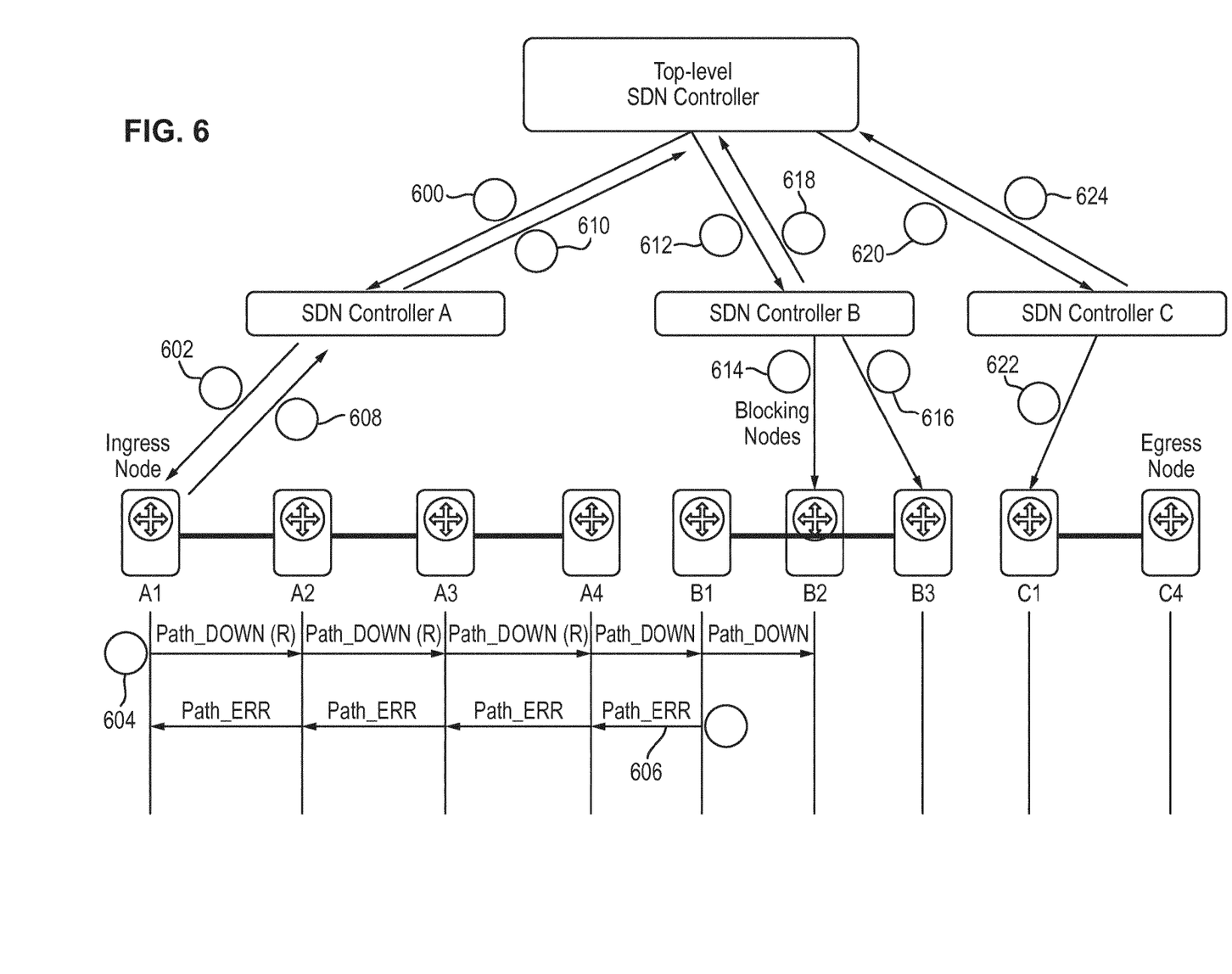
FIG. 6 shows an example of communications within a multi-domain network.

FIG. 6 shows an example of communications within a multi-domain network, where a LSP traverses multiple network domains. The different domains may in some examples belong to different network operators and/or service providers. Confidentiality can be a requirement between the domains and if the LSP deletion fails in a domain (e.g. due to an unresponsive node) where no or very little topological info is known, there may be cooperation between SDN controllers. In the example shown in FIG. 6, network domain A includes LSP nodes A1, A2, A3 and A4 that are controlled by SDN controller A. Network domain B includes nodes B1, B2 and B3 controlled by SDN controller B. Network domain C includes nodes C1 and C4 in the LSP and are controlled by SDN controller C. Node A1 is the ingress node for the whole LSP, and Node C4 is the egress node for the whole LSP. Each SDN controller A, B and C can communicate with a top-level (for the network or network portion shown in FIG. 6) SDN controller.

The LSP tear down procedure can be initiated by the hierarchical SDN controller by message 600 or the domain controller where the ingress node is located, e.g. SDN controller A, by message 602. The ingress node A1 starts the safe deletion procedure (e.g. carries out the method 100 of FIG. 1). In this example, node B2 in domain B is unresponsive or unreachable, and in response to a first message 604 to inform nodes of the tear down, message 606 is returned (e.g. by the preceding node B1) to the ingress node. The message 606 may identify the node B2. At this point, node A1 knows that the deletion failure occurred in domain B because the message 606 was sent by B1, and thus can determine that node B2 is unreachable or unresponsive. The fact that there was a failure to inform all nodes of the LSP, along with the received info (e.g. identification of B2), is passed to SDN controller A in message 608 from node A1. SDN controller A in turn forwards the message to the top-level SDN controller as message 610 as B1 and B2 are not under its direct control. The top-level SDN controller is told that the LSP release or deletion procedure failed in domain B at node B2, but the portion of the LSP in domain C may also need to be released or deleted. Therefore, the top-level SDN controller may to communicate both with SDN controller B and C. A message 612 is sent to SDN controller B to ask for the removal of the remaining of the LSP in domain B, i.e. within nodes B2 and B3, and SDN controller B can send messages 614 and 616 to nodes B2 and B3 respectively accordingly. When complete, SDN controller B may send an acknowledgement 618 to the top-level SDN controller. In domain C, all the LSP nodes (i.e. C1 and C4) may be operational, and hence the top-level SDN controller may send a normal deletion message 620 (e.g. similar to message 600 and/or 602) is sent to SDN controller C, which sends a message 622 to node C1 to delete the portion of the LSP in domain C (e.g. carry out the method 100 of FIG. 1). Once the procedure is complete in domain C, SDN controller C may send an acknowledgement 624 to the top-level SDN controller. As a result, the top-level SDN controller may determine, from messages 610, 618 and 624, that the LSP deletion procedure has completed and the related resources released in all network domains A, B and C. In other examples, there may be any number of network domains and there may be any number of nodes of the LSP in each domain.

Figure 7:
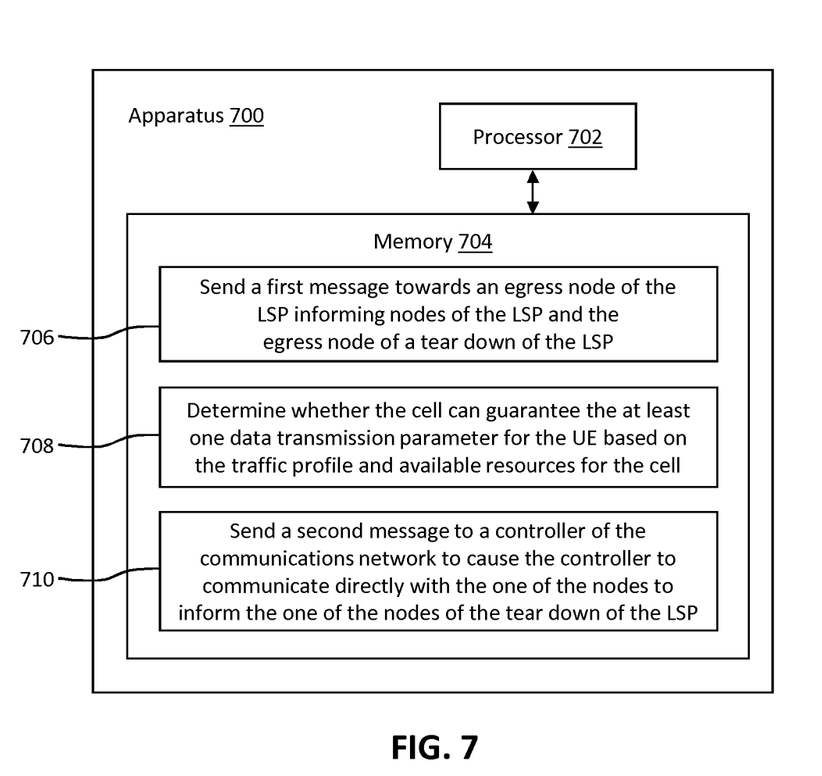
FIG. 7 shows an example of apparatus for tearing down a LSP through a communications network.

FIG. 7 shows an example of apparatus 700 for tearing down a label switched path (LSP) through a communications network. The apparatus 700 comprises a processor 702 and a memory 704. The memory 704 contains instructions 706 executable by the processor 702 such that the apparatus 700 is operable to send a first message towards an egress node of the LSP informing nodes of the LSP and the egress node of a tear down of the LSP, and instructions 708 executable by the processor 702 such that the apparatus 700 is operable to determine that one of the nodes of the LSP has not forwarded the first message along the LSP. The memory 704 also contains instructions 710 executable by the processor 702 such that the apparatus 700 is operable to send a second message to a controller of the communications network to cause the controller to communicate directly with the one of the nodes to inform the one of the nodes of the tear down of the LSP. In some examples, the apparatus 700 comprises or is included in a network node such as a LSP node or LSP ingress or egress node.

Figure 8:
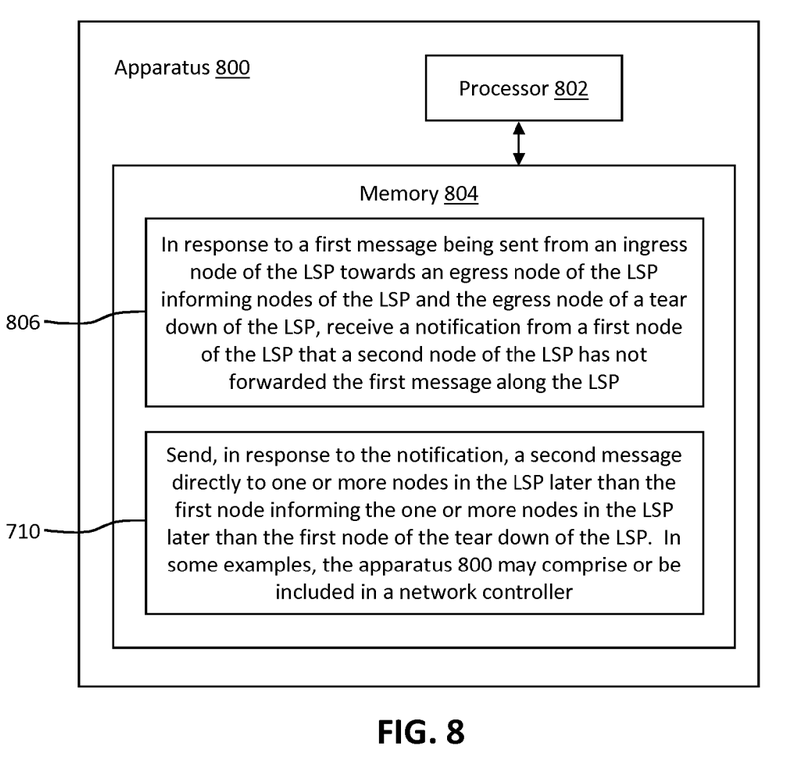
FIG. 8 shows an example of apparatus for tearing down a LSP through a communications network.

FIG. 8 shows an example of apparatus 800 for tearing down a label switched path (LSP) through a communications network. The apparatus 780 comprises a processor 802 and a memory 804. The memory 804 contains instructions 806 executable by the processor 802 such that the apparatus 800 is operable to, in response to a first message being sent from an ingress node of the LSP towards an egress node of the LSP informing nodes of the LSP and the egress node of a tear down of the LSP, receive a notification from a first node of the LSP that a second node of the LSP has not forwarded the first message along the LSP. The memory 804 also contains instructions 808 executable by the processor 802 such that the apparatus 800 is operable to send, in response to the notification, a second message directly to one or more nodes in the LSP later than the first node informing the one or more nodes in the LSP later than the first node of the tear down of the LSP. In some examples, the apparatus 800 may comprise or be included in a network controller.

Embodiments of this disclosure include apparatus (e.g. a network node) for tearing down a label switched path (LSP) through a communications network, the apparatus configured to send a first message towards an egress node of the LSP informing nodes of the LSP and the egress node of a tear down of the LSP, determine that one of the nodes of the LSP has not forwarded the first message along the LSP, and send a second message to a controller of the communications network to cause the controller to communicate directly with the one of the nodes to inform the one of the nodes of the tear down of the LSP.

Embodiments of this disclosure include apparatus (e.g. a network controller) for tearing down a label switched path (LSP) through a communications network, the apparatus comprising a receiving module configured to, in response to a first message being sent from an ingress node of the LSP towards an egress node of the LSP informing nodes of the LSP and the egress node of a tear down of the LSP, receive a notification from a first node of the LSP that a second node of the LSP has not forwarded the first message along the LSP, and a second sending module configured to send, in response to the notification, a second message directly to one or more nodes in the LSP later than the first node informing the one or more nodes in the LSP later than the first node of the tear down of the LSP.

Embodiments of this disclosure include apparatus (e.g. a network node) for tearing down a label switched path (LSP) through a communications network, the apparatus comprising a first sending module configured to send a first message towards an egress node of the LSP informing nodes of the LSP and the egress node of a tear down of the LSP, a determining module configured to determine that one of the nodes of the LSP has not forwarded the first message along the LSP, and a second sending module configured to send a second message to a controller of the communications network to cause the controller to communicate directly with the one of the nodes to inform the one of the nodes of the tear down of the LSP.

Embodiments of this disclosure include apparatus for tearing down a label switched path (LSP) through a communications network, the apparatus configured to in response to a first message being sent from an ingress node of the LSP towards an egress node of the LSP informing nodes of the LSP and the egress node of a tear down of the LSP, receive a notification from a first node of the LSP that a second node of the LSP has not forwarded the first message along the LSP, and send, in response to the notification, a second message directly to one or more nodes in the LSP later than the first node informing the one or more nodes in the LSP later than the first node of the tear down of the LSP.

It should be noted that the above-mentioned examples illustrate rather than limit the invention, and that those skilled in the art will be able to design many alternative examples without departing from the scope of the appended statements. The word "comprising" does not exclude the presence of elements or steps other than those listed in a claim, "a" or "an" does not exclude a plurality, and a single processor or other unit may fulfil the functions of several units recited in the statements below. Where the terms, "first", "second" etc. are used they are to be understood merely as labels for the convenient identification of a particular feature. In particular, they are not to be interpreted as describing the first or the second feature of a plurality of such features (i.e. the first or second of such features to occur in time or space) unless explicitly stated otherwise. Steps in the methods disclosed herein may be carried out in any order unless expressly otherwise stated. Any reference signs in the statements shall not be construed so as to limit their scope.

The invention claimed is:

1. A method for tearing down a label switched path (LSP) through a communications network, the method comprising:
    sending a first message towards an egress node of the LSP, the first message informing nodes of the LSP and the egress node of a tear down of the LSP;

determining that one of the nodes of the LSP has not forwarded the first message along the LSP; and sending a second message to a controller of the communications network to cause the controller to communicate directly with the one of the nodes to inform the one of the nodes of the tear down of the LSP.

2. The method of claim 1, wherein determining that the one of the nodes of the LSP has not forwarded the first message along the LSP comprises determining that the one of the nodes of the LSP has not acknowledged receipt of the first message.

3. The method of claim 2, wherein determining that the one of the nodes of the LSP has not acknowledged receipt of the first message comprises receiving a notification from another node in the LSP earlier in the LSP than the one of the nodes in the LSP.

4. The method of claim 1, wherein the first message informs the nodes of the LSP and the egress node that a tear down of the LSP will occur.

5. The method of claim 4, comprising sending a third message towards the one of the nodes of the LSP instructing the nodes of the LSP to tear down the LSP.

6. The method of claim 1, wherein the method is carried out by an ingress node of the LSP.

7. The method of claim 1, wherein sending the second message to the controller of the communications network causes the controller to communicate directly with one or more further nodes of the LSP later than the one of the nodes of the LSP to inform the one or more further nodes of the LSP nodes of the tear down of the LSP.

8. The method of claim 1, comprising, in response to determining that the one of the nodes of the LSP has not forwarded the first message along the LSP, sending a notification to the egress node along a path other than the LSP that the one of the nodes of the LSP has not forwarded the first message along the LSP.

9. The method of claim 8, wherein sending the notification to the egress node causes the egress node to send a third message towards an ingress node of the LSP informing nodes of the LSP of the tear down of the LSP.

10. The method of claim 9, wherein sending the notification to the egress node causes the egress node to:
   determine that a further one of the nodes of the LSP has not forwarded the third message along the LSP; and
   send a fourth message to the controller of the communications network to cause the controller to communicate directly with the further one of the nodes to inform the further one of the nodes of the tear down of the LSP.

11. The method of claim 1, wherein sending the second message to the controller of the communications network comprises causing the controller to send a message to an ingress node of a different network domain to the controller to send a message towards an egress node of the LSP in the different network domain to inform nodes of the LSP in the different domain and the egress node of the different domain of the tear down of the LSP.

12. The method of claim 11, wherein the message to the ingress node of the different network domain is sent by a further controller of the different network domain.

13. The method of claim 1, wherein the second message identifies the one of the nodes of the LSP that has not forwarded the first message along the LSP.

14. The method of claim 13, wherein the one of the nodes of the LSP that has not forwarded the first message along the LSP is in an alternative network domain than the controller.

15. The method of claim 14, wherein sending the second message to the controller of the communications network causes the controller to send a further message to an alternative controller of the alternative network domain, wherein the further message identifies the one of the nodes of the LSP that has not forwarded the first message along the LSP.

16. The method of claim 14, wherein sending the first message towards the egress node of the LSP comprises sending the first message towards the egress node of the LSP in response to an instruction from the controller to tear down the LSP.

17. The method of claim 16, wherein the instruction from the controller to tear down the LSP is in response to an instruction from a controller in a different network domain than the controller to tear down the LSP.

18. A method for tearing down a label switched path (LSP) through a communications network, the method comprising:
   in response to a first message being sent from an ingress node of the LSP towards an egress node of the LSP, the first message informing nodes of the LSP and the egress node of a tear down of the LSP, receiving a notification from a first node of the LSP that a second node of the LSP has not forwarded the first message along the LSP; and
   sending, in response to the notification, a second message directly to one or more nodes in the LSP later than the first node informing the one or more nodes in the LSP later than the first node of the tear down of the LSP.

19. The method of claim 18, wherein the first node of the LSP comprises the ingress node.

20. The method of claim 18, wherein the first node in the LSP is earlier than the second node in the LSP.

21. The method of claim 18, wherein sending the second message directly to the one or more nodes in the LSP comprises sending a message to each of the one or more nodes in the LSP.

22. The method of claim 18, wherein the one or more nodes in the LSP later than the first node comprise nodes in a first domain, the LSP includes nodes in a second domain, and the method comprises sending, to a controller of the second domain, a notification that the second node of the LSP has not forwarded the first message along the LSP.

23. The method of claim 22, wherein the notification to the controller of the second domain identifies the second node, wherein the second node is in the second domain.

24. The method of claim 18, comprising sending a message to the ingress node of the LSP to cause the ingress node to send the first message towards the egress node of the LSP.

25. An apparatus for tearing down a label switched path (LSP) through a communications network, the apparatus comprising a processor and a memory, the memory containing instructions executable by the processor such that the apparatus is operable to:
   send a first message towards an egress node of the LSP informing nodes of the LSP and the egress node of a tear down of the LSP;
   determine that one of the nodes of the LSP has not forwarded the first message along the LSP; and
   send a second message to a controller of the communications network to cause the controller to communicate directly with the one of the nodes to inform the one of the nodes of the tear down of the LSP.

26. An apparatus for tearing down a label switched path (LSP) through a communications network, the apparatus comprising a processor and a memory, the memory containing instructions executable by the processor such that the apparatus is operable to:

in response to a first message being sent from an ingress node of the LSP towards an egress node of the LSP informing nodes of the LSP and the egress node of a tear down of the LSP, receive a notification from a first node of the LSP that a second node of the LSP has not forwarded the first message along the LSP; and send, in response to the notification, a second message directly to one or more nodes in the LSP later than the first node informing the one or more nodes in the LSP later than the first node of the tear down of the LSP.

* * * * *